UNITED STATES PATENT OFFICE.

ALFRED BERTHEIM AND PAUL KARRER, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ARSENIC-ANTIMONY COMPOUND AND PROCESS OF MAKING SAME.

1,111,821.      Specification of Letters Patent.      Patented Sept. 29, 1914.

No Drawing.      Application filed September 24, 1913. Serial No. 791,550.

*To all whom it may concern:*

Be it known that we, ALFRED BERTHEIM, Ph. D., professor of chemistry, and PAUL KARRER, Ph. D., chemist, citizens of the Empire of Germany and Switzerland, respectively, residing at Frankfort-on-the-Main, Germany, have invented certain new and useful Improvements in Arsenic-Antimony Compounds and Processes of Making Same, of which the following is a specification.

We have found that by reducing a mixture of an aromatic arsinic acid with an antimony compound, such, for instance, as tartar emetic (potassium-antimony-tartrate), phenylstibinic acid or oxyphenylstibinic acid, compounds are obtained containing arsenic and antimony, and in which most probably the atom group: —As=Sb— is contained. In practice the method for producing the said compounds is as follows: An aromatic arsinic acid and an antimony compound are dissolved and then mixed in quantities proportionate to their equivalent weights, whereupon a strong reducing agent, such as sodium hydrosulfite, is added. As intermediate products are obtained arsenoxids which correspond to the arsinic acids, and which are therefore to be regarded in this process as equivalents of the latter. The said new compounds are insoluble in water, but soluble in diluted hydrochloric acid or diluted caustic soda-lye, they form colored powders and are of therapeutical value for the treatment of infectious diseases.

The following example illustrates our invention: There are dissolved: on the one hand, 23.3 grams of 3-amino-4-oxyphenylarsinic acid in 400 cc. of water and 60 cc. of 2N caustic soda-lye, and, on the other hand, 33.2 grams of tartar emetic in 650 cc. of water, whereupon the two solutions are mixed. This mixture is run into a solution of 500 grams of concentrated sodium hydrosulfite and 100 grams of magnesium chlorid in 2.5 liters of water and the whole is digested, while well stirring at 50–55° C., until a filtered sample no longer yields a precipitate when heated. The precipitate which is copiously formed is filtered, washed and dried in a vacuum. It then forms a reddish-brown powder which is clearly soluble in dilute hydrochloric acid and in aqueous caustic soda-lye.

Having now described our invention, what we claim is:

1. The process of preparing organic arsenic antimony compounds, which consists in treating with a strong reducing agent the mixture of an aromatic arsinic acid and an antimony compound in solution.

2. As new products, organic arsenic-antimony compounds containing most probably the atom group —As=Sb—, the arsinic atom being linked to an aromatic radical; said compounds being colored powders, insoluble in water, but soluble in diluted hydrochloric acid and diluted caustic soda-lye.

In testimony whereof, we affix our signatures in presence of two witnesses.

ALFRED BERTHEIM.
PAUL KARRER.

Witnesses:
    JEAN GRUND,
    CARL GRUND.